United States Patent [19]

Takatsuka et al.

[11] Patent Number: 5,070,229
[45] Date of Patent: Dec. 3, 1991

[54] WINDOW HEATER CONTROLLING APPARATUS PROVIDING A GRADUAL HEATING VOLTAGE

[75] Inventors: Hiromichi Takatsuka, Tokyo; Tetsuzo Kosaka, Isesaki, both of Japan

[73] Assignee: Nissan Motor Co., Ltd., Yokohama, Japan

[21] Appl. No.: 329,850

[22] Filed: Mar. 28, 1989

[30] Foreign Application Priority Data

Mar. 28, 1988 [JP] Japan .................................. 63-39666

[51] Int. Cl.⁵ ............................ H05B 1/02; B60L 1/02
[52] U.S. Cl. .................................... 219/203; 219/492; 219/505; 219/501; 323/238; 323/901
[58] Field of Search ............... 219/203, 202, 491, 494, 219/497, 501, 505, 492, 507–509; 323/238, 901; 307/117

[56] References Cited

U.S. PATENT DOCUMENTS

| 4,307,440 | 12/1981 | Inoue et al. | 323/901 |
| 4,357,524 | 11/1982 | Apfelbeck et al. | 219/203 |
| 4,621,313 | 11/1986 | Kiteley | 323/901 |
| 4,730,097 | 3/1988 | Campbell et al. | 219/203 |
| 4,868,486 | 9/1989 | Shinoda | 323/238 |

FOREIGN PATENT DOCUMENTS

| 2115241 | 9/1983 | United Kingdom | 219/203 |
| 2198261 | 6/1988 | United Kingdom | 219/203 |

Primary Examiner—Mark H. Paschall
Attorney, Agent, or Firm—Foley & Lardner

[57] ABSTRACT

In a window heater controlling apparatus used in an automobile, a heater control unit including a microcomputer is employed to detect a heater-ON condition and thereafter to control the heating voltage of the alternator in such a manner that the heating voltage is gradually increased up to the rated heating voltage at the beginning of the heater control operation. This heater control operation can be performed by duty ratio control of the switching transistor.

2 Claims, 6 Drawing Sheets

WINDOW HEATER CONTROLLING APPARATUS PROVIDING A GRADUAL HEATING VOLTAGE

BACKGROUND OF THE INVENTION

1. Field of the Invention

The present invention relates to an apparatus for controlling a heater for heating a window of an automobile so as to eliminate frost, snow, ice, and so forth.

2. Description of the Related Art

The above-described window heater controlling apparatus for an automobile is known from, e.g., Japanese Patent Publication No. 61-33735 (1986).

In this conventional window heater controlling apparatus as shown in FIG. 1, a heating resistor element 1 made of a metal powder using the vapor method is mounted on a window glass such as a windshield of an automobile (not shown in detail). While heating the window by this heater element 1, frost, snow and ice or the like are melted away.

More specifically, either when an ice-melting switch 2 is turned off, or after five minutes have passed since this switch 2 is turned on, a contact 3a of a control relay 3 is changed over in response to an energizing signal derived from a heater control unit 4 so that electronic connections are made between an output unit 6 of an alternator 5, a battery 7 having a rated voltage of 12 V, and other electric loads. Based upon the output voltage produced from the output unit 6 of the alternator 5, a voltage regulator 8 controls an energizing current supplied to a rotor coil 5a of the alternator 5 in such a manner that an output voltage applied to a stator coil 5b of the alternator 5 is set up to, for instance, 13.5 V when the battery voltage is lower than 12.5 V. That is, the regulator 8 performs the normal voltage control. It is so designed that the energizing current is furnished from the battery 7 via the control unit 4 and an ignition switch 9 to this voltage regulator 8.

To the contrary, when five minutes have not yet passed since the ice-melting switch 2 is turned on and also unless this switch 2 is turned off, the above-described normal voltage control is interrupted so as to execute the ice melting operation.

In other words, when a detection is made that a gear shift position sensor 10 detects that the gear shift position of the power transmission is at the neutral position (involving the parking position), namely an automobile is stopped, the control unit 4 performs the following control operations after interrupting the generation of the alternator 5. That is, an electronic fuel control unit 12 is under control such that the output voltage of the alternator 5 is increased up to 60 V, for example, in response to a detection voltage across a voltage detecting resistor 11. The electronic fuel control unit 12 controls a supply amount of a fuel to an engine of the automobile as follows. When the engine revolution is increased, the higher output voltage is produced from the alternator 5, whereby the higher output voltage can be matched with the power consumption of the above-described heater element 1.

The control unit 4 switches the contact 3a of the control relay 3 so as to connect the output unit 5a of the alternator 5 with the electric heater resistor 1. Thereafter, a maximum energizing current is supplied to the rotor coil 5a in order to commence the generation for the ice-melting operation.

Thus, the heater resistor 1 is energized to heat the resistor itself, whereby iced particles such as frost and snow attached to the window glass are melted away.

Reference numeral 13 indicates an ignition relay for supplying a power supply voltage to the control unit 4; reference numeral 14 indicates an indication lamp for ice-melting operation; and, reference numeral 15 is a charge lamp for indicating whether or not the alternator 5 generates the AC power.

In the above-described conventional heater controlling apparatus, after the control relay 3 is changed when the ice-melting operation is commenced, the power generation by the alternator is again performed by supplying the maximum energizing current to the rotor coil 5a of the alternator 5 in such a manner that the output voltage appearing the stator coil 5b becomes 60 V. As a result, the following problems may be caused.

Since the load current of the electric resistor 1 flows through the alternator 5 at the substantially same time as the power generation by the alternator 5 starts, a reaction torque is exerted in the alternator 5, by which the rotation of alternator 5 is stopped. In particular, the great reaction torque caused by the heavy electric load such as the electric resistor 1, is simultaneously produced when the heavy load current flows through the alternator 5. As a result, since the engine speed is lowered, or the engine power is considerably lowered, the idling operation is brought into an unstable condition which causes higher vibrations, or shocks due to changes in the driving torque. As a consequence, a comfortable driving cannot be achieved.

SUMMARY OF THE INVENTION

The present invention has been made in an attempt to solve the conventional problems, and therefore has an object to provide a heater controlling apparatus for a window of an automobile, capable of suppressing the reaction torque which is exerted when the energizing operation to the heating element is commenced.

A window heater controlling apparatus, according to the invention, comprises:

a generator (C) for generating a heating voltage to be applied to the window heater (B);

a detector (D) for detecting a heater-ON condition; and, a controller (E) for controlling the generator (C) so as to gradually increase the heating voltage up to a predetermined heating voltage with respect to a lapse of time upon detection of the heater-ON condition.

DETAILED DESCRIPTION OF THE PREFERRED EMBODIMENTS

BASIC STRUCTURE

Before describing numerous implementations, the basic structure of the window heater controlling apparatus according to the invention will now be described with reference to FIG. 2.

Figure 2:
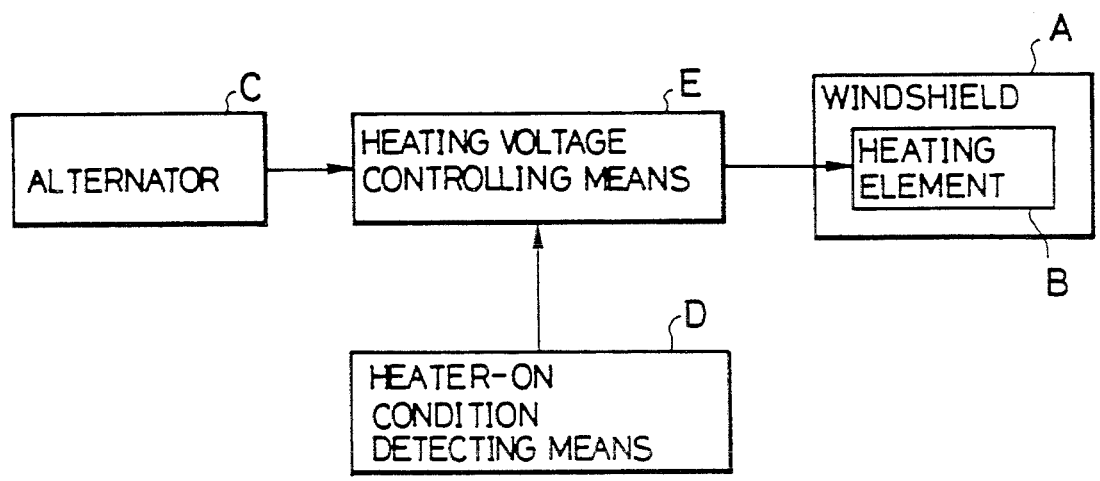
FIG. 2 is a schematic block diagram for explaining a window heater controlling apparatus according to the present invention.

As shown in a block diagram of FIG. 2, the window heater controlling apparatus according to the basic structure of the present invention includes a heating element "B" mounted on a window, e.g., a windshield "A"; an alternator "C"; a heating voltage controlling means "E"; and a heater-ON condition detecting means "D". The heating element "B" is heated by receiving the heating voltage generated in the alternator "C" through the heating voltage controlling means "E". When the heater-ON condition is detected by the heater-ON condition detecting means "D"; the heating voltage is gradually increased to a predetermined voltage, i.e., a rated heater voltage in the heating voltage controlling means "E" with respect to a lapse of time. As a result, the reaction torque occurring at the beginning of the heater-ON operation is suppressed.

FIRST WINDOW HEATER CONTROLLING APPARATUS

Figure 1:
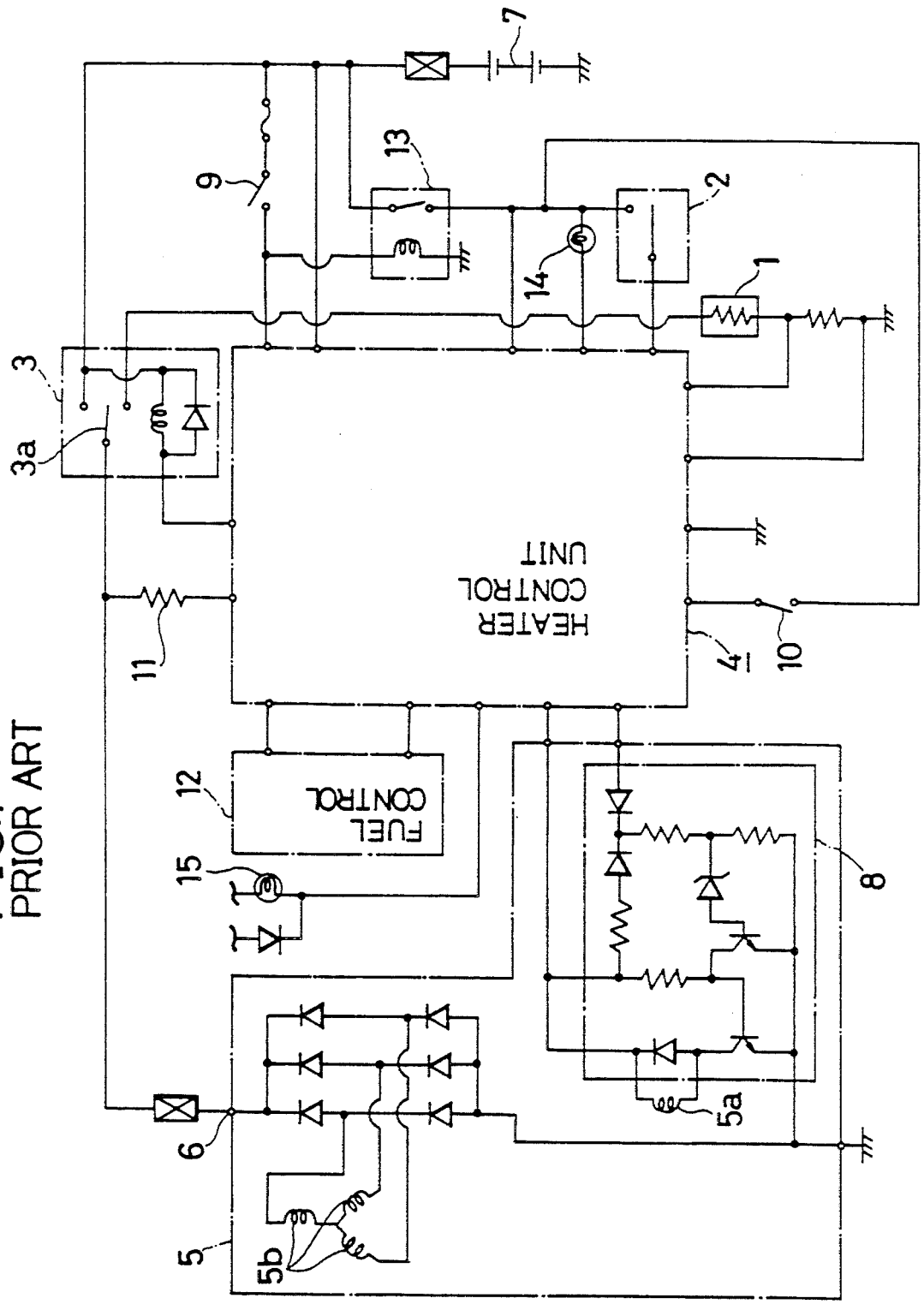
FIG. 1 is a circuit diagram of the conventional window heater controlling apparatus.

Referring now to FIGS. 3 to 6, a window heater controlling apparatus according to a first preferred embodiment will be described. It should be noted that the same reference numerals shown in FIG. 1 will be employed as those for denoting the same or similar circuit elements shown in the following figures.

Figure 3:
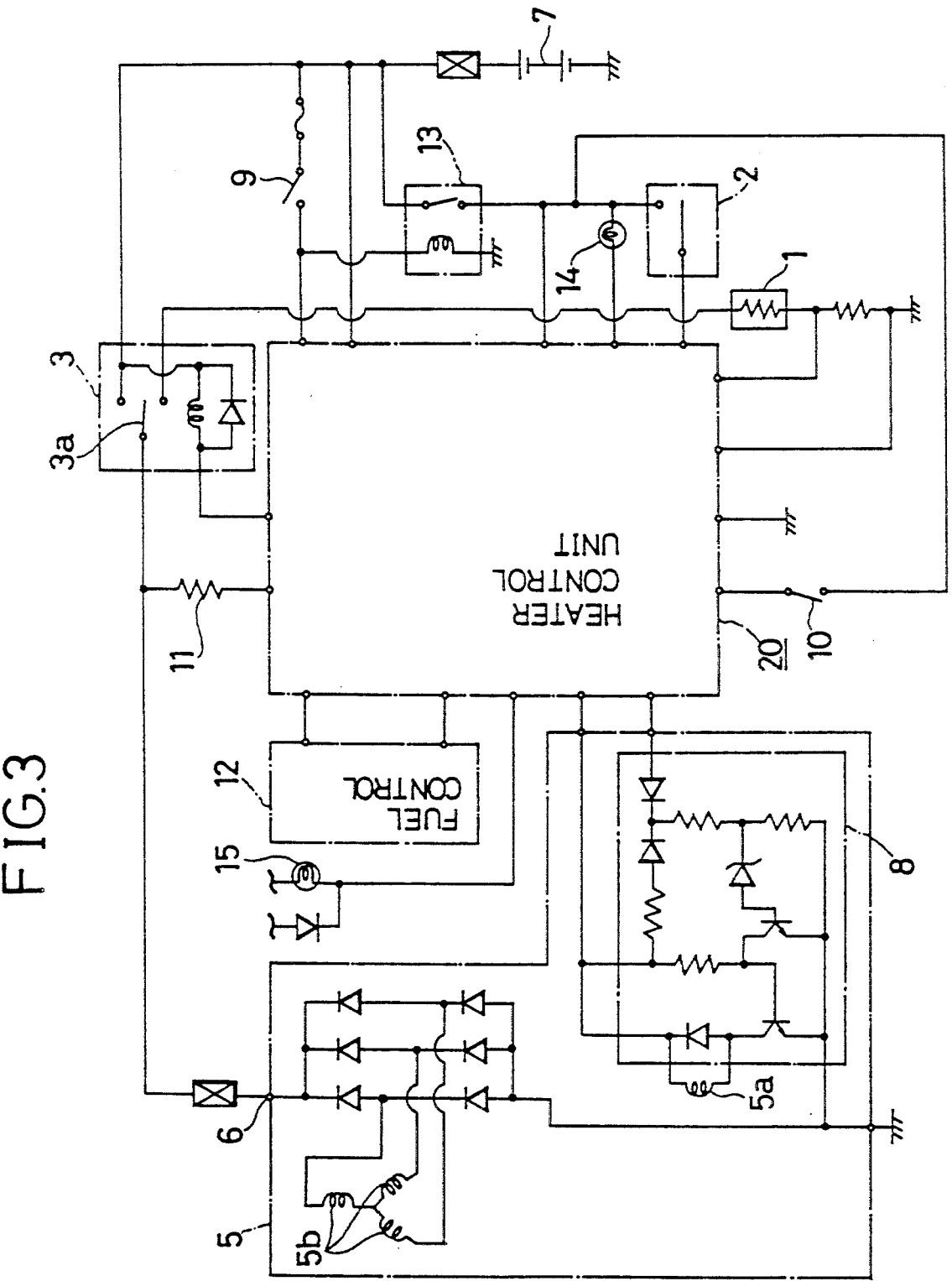
FIG. 3 is a circuit diagram of a window heater controlling apparatus according to a first preferred embodiment of the invention.

In the circuit diagram shown in FIG. 3, a heater control unit 20 including a microcomputer or the like (not shown in detail) receives the ON/OFF signal derived from the ice-melting switch 2; and the gear shift position signal produced from the gear shift position sensor 10.

A major control function of this heater control unit 20 involves switching operation of the contact 3a of the control relay 3, and the supply of the energizing current to the rotor coil 5a of the alternator 5.

Also, this heater control unit 20 functions as the above-described heating voltage controlling means "E" and heater-ON condition detecting means "D" shown in FIG. 2.

This control unit 20 may be arranged in such a way that, for instance, a duty ratio control (PWM control) of a transistor is performed so as to gradually increase the energizing current to the rotor coil 5a of the alternator 5 under the control of a CPU and a timer (not shown in detail).

Figure 4:
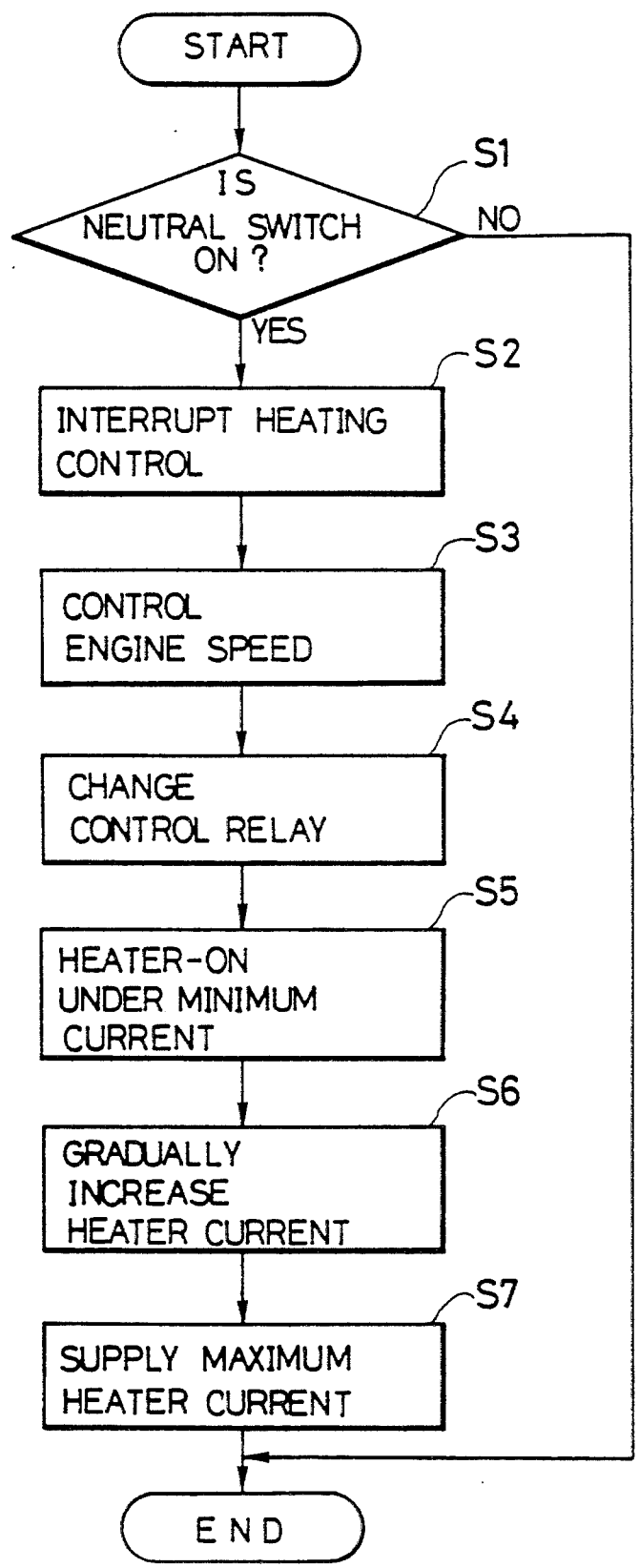
FIG. 4 is a flowchart for explaining a window heater controlling operation of the window heater controlling apparatus shown in FIG. 3.

Referring to a flowchart shown in FIG. 4, a heater control by the heater control unit 20 will now be described in detail. The control routine defined in this flowchart is commenced when the ice-melting switch 2 is turned on.

In a first step S1, a judgement is made whether or not the gear shift position of the power transmission detected by the gear shift position sensor 10 indicates the neutral position (including the parking position). If Yes, a judgement is made that the automobile is in the stopping condition. Then, the control process is advanced to the next step S2. If No, then this control routine is completed. When the ice-melting switch 2 is turned on and simultaneously the automobile is in the stopping condition, the heater control unit 20 judges that the present condition corresponds to "the heater-ON condition", whereby the low heating voltage is applied to the heating resistance element 1 (will be discussed later in detail).

At the step S2, the heating voltage control similar to the conventional method is interrupted so as to stop the generating operation by the alternator 5. The control process is advanced to a step S3.

In this step S3, the electronic fuel controller 12 is controlled in the conventional manner so as to increase the engine speed. Thereafter, the control process is advanced to a step S4.

In the step S4, the contact 3a of control relay 3 is controlled by the heater control unit 20 in such a manner that the output unit 6 of the alternator 5 is connected to the heating element 1. Subsequently, the control process is advanced to a step S5.

In this step S5, the heater control unit 20 controls the voltage regulator 8 in such a way that a minimum energizing current flows through the rotor coil 5a of the alternator 5.

In the next step S6, this minimum energizing current is gradually increased by adding a predetermined current thereto at a predetermined time interval with respect to a lapse of time. Thus, this minimum energizing current is increased up to a maximum (rated) heater current, e.g., 3A within a predetermined time period, e.g., 3 to 5 seconds. Since the gradually increased energizing current is supplied to the rotor coil 5a, the output voltage of the alternator 5 is gradually increased and finally becomes a maximum (rated) voltage thereof, e.g., 60 V.

After this energizing current becomes the maximum value (e.g., 3A), this maximum (rated) current is continuously supplied to the rotor coil 5a (step S7). Thus, the normal heating operation of the heater element 1 is achieved.

As previously described, since the small energizing current flows through the rotor coil 5a at the beginning of the heater control operation (heater-ON condition), the reaction torque of the alternator 5 is also small. As a result, because an increase of the reaction torque can be suppressed even if such a small energizing current is supplied to the heater element 1, the reduction of the engine speed or engine power can be prevented. Thus, the stabilities of the idle speed of the engine can be improved, and furthermore the mechanical vibrations occurring in the idling operation or the engine torque can be suppressed so as not to apply the mechanical shocks to a car user, resulting in more comfortable driving.

The maximum (rated) energizing current is continuously supplied to the rotor coil 5a of the alternator 5, whereby the normal ice melting operation is performed in the heater element 1.

REACTION TORQUE CHARACTERISTICS

Figure 5:
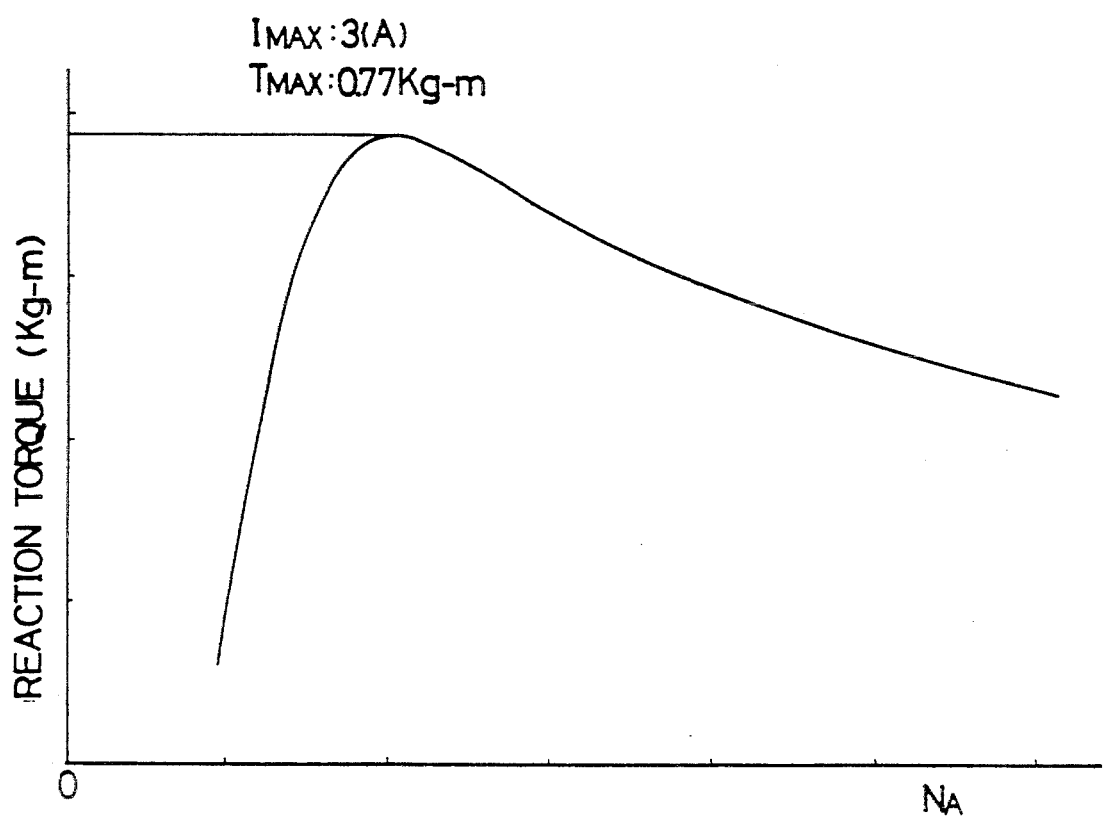
FIG. 5 and 6 are graphic representations for explaining a relationship between the reaction torque and the revolution number of the alternator.

FIG. 5 represents variations in the reaction torque with respect to a lapse of time while the maximum (rated) energizing current, e.g., 3A is supplied to the rotor coil 5a of the alternator 5. As shown in FIG. 5, a maximum reaction torque becomes approximately 0.77 kg-m.

Figure 6:
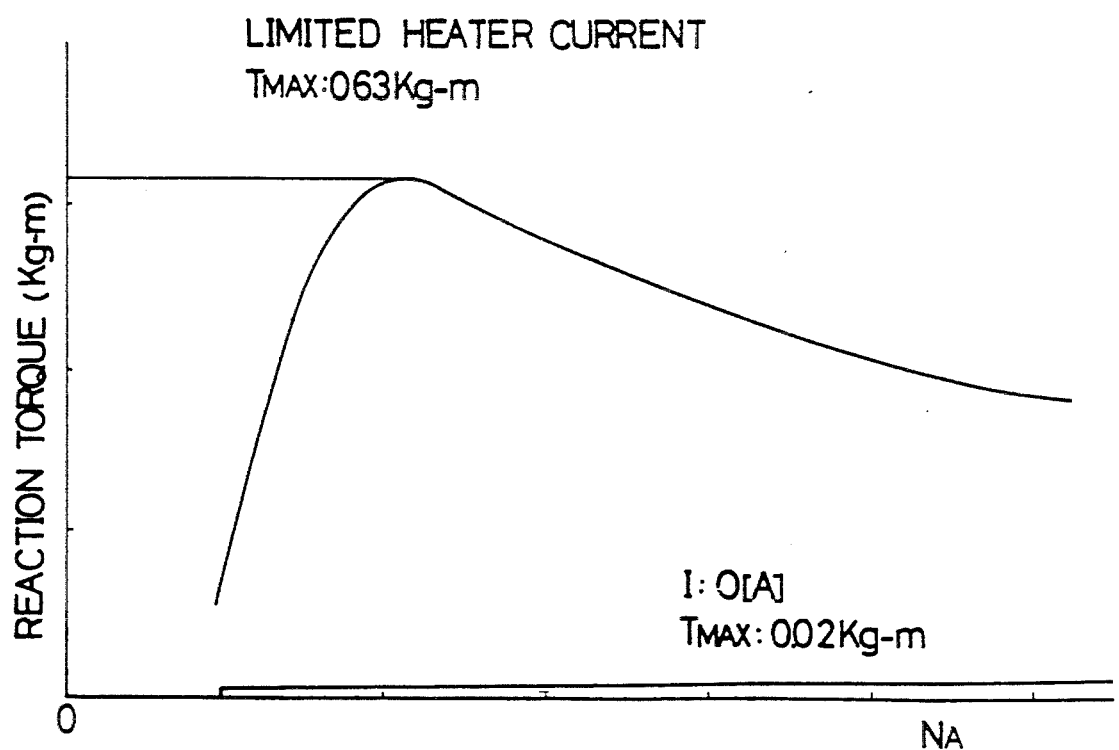

In FIG. 6, there are shown vibrations in the reaction torque with regard to the time lapse while the energizing current for the rotor coil 5a is under control of the heater control unit 20. As shown in FIG. 6, is maximum reaction torque is about 0.63 kg-m.

As is apparent from the foregoings, the reaction torque occurring in the alternator 5 is sufficiently suppressed during the heater control operation, i.e., at the beginning of the heater-ON operation.

SECOND WINDOW HEATER CONTROLLING APPARATUS

A description will now be made on a window heater controlling apparatus according to a second preferred embodiment with reference to FIGS. 7 and 8.

Figure 7:
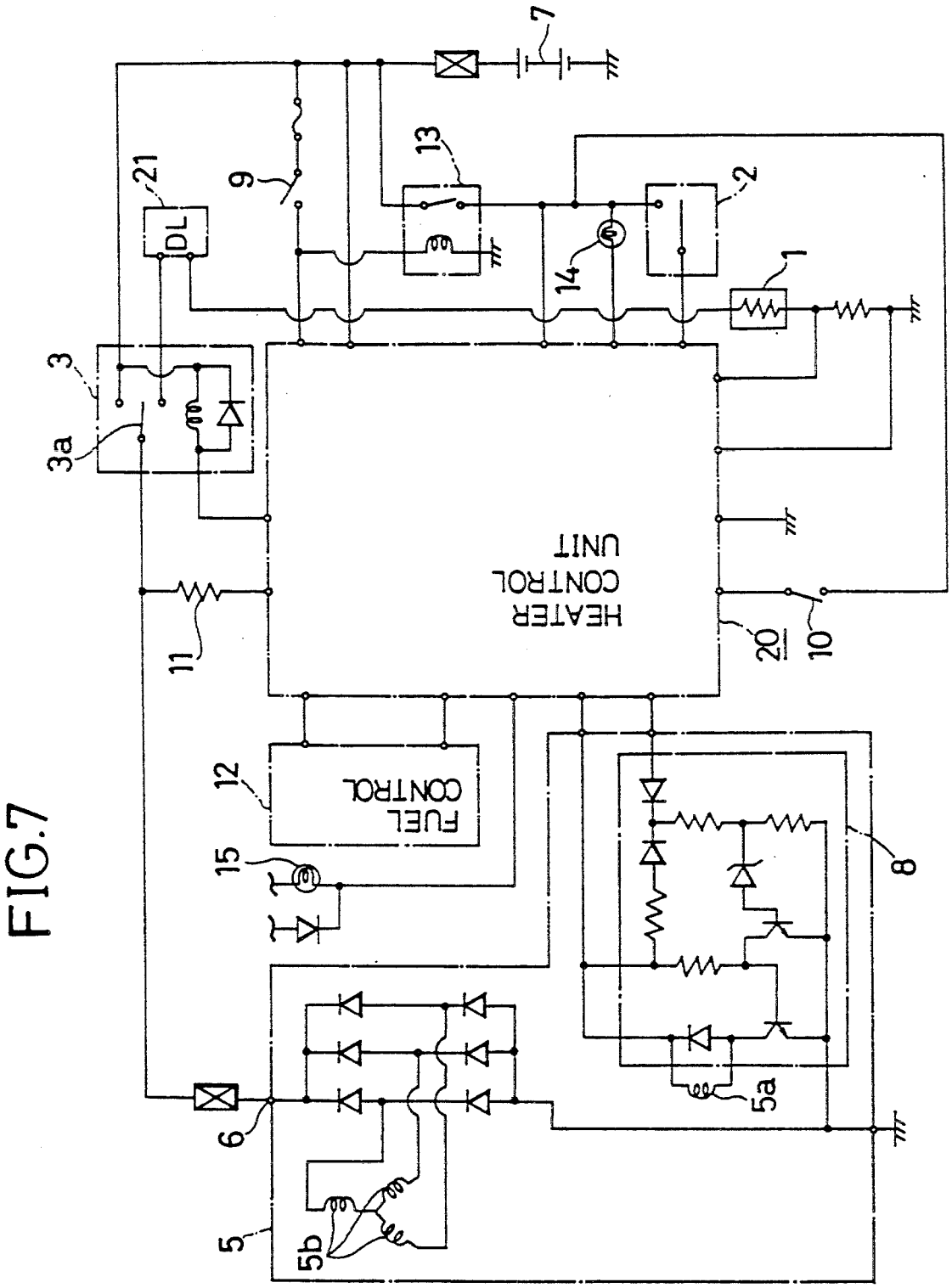
FIG. 7 is a circuit diagram of a window heater controlling apparatus according to a second preferred embodiment of the invention; and, FIG. 8 represents waveforms for explaining transition periods of the heater controlling operation according to the sound preferred embodiment.

As apparent from the circuit diagram shown in FIG. 7, the feature of this heater controlling apparatus is to newly employ a delay circuit 21 interposed between the heater element 1 and control relay 3.

Figure 8:
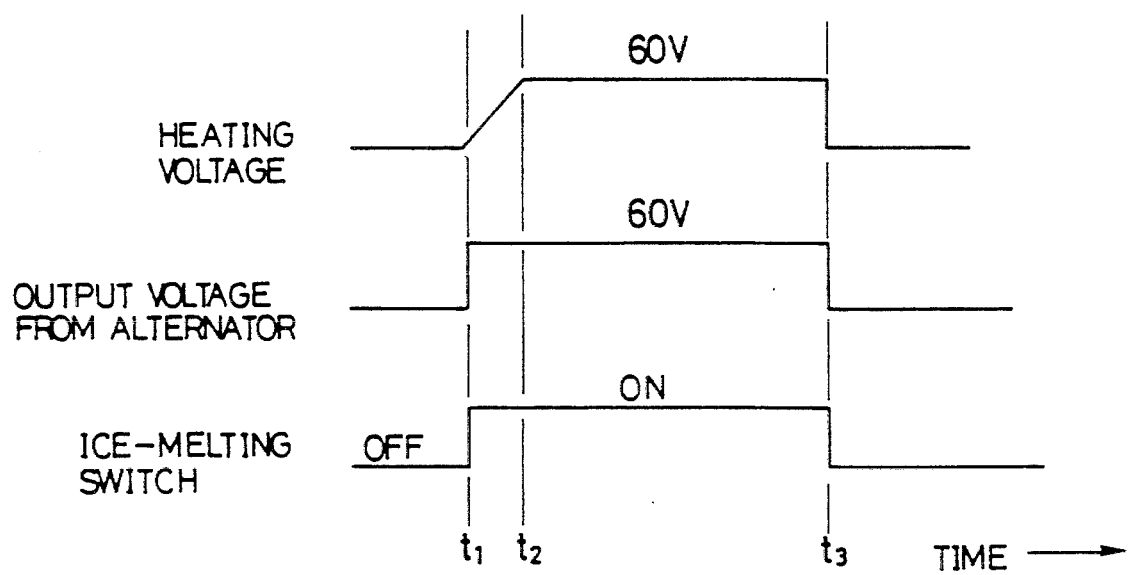

As represented in a graph of FIG. 8, when the rated supply voltage, e.g., 60 V is applied to this delay circuit 21, the delay circuit 21 controls an output voltage thereof in such a manner that the output voltage is gradually increased from "O" volt at a time instant "t1" to 60 V at the beginning of the heater control operation. After a predetermined time has passed, this output voltage reaches the rated voltage, i.e., 60 V at a time instant "t2". Then, the normal heating operation is continued until the ice-melting switch 9 is turned off (at a time instance "t3").

Accordingly, since the small load current flows through the alternator 5 at the beginning of the heater control operation, the reaction torque produced in the alternator 5 can be similarly suppressed.

It should be noted that since any type of conventional delay circuit may be utilized as this delay circuit 21, no detailed additional discussion of the delay circuit is set forth in the specification.

As has been described above, in the window heater controlling apparatus according to the present invention, the heating voltage applied to the window heating element is first set to a minimum value and gradually increased up to the rated value thereof at the beginning of the heater control operation just after the ice-melting switch is turned on. As a consequence, the reaction torque occurring in the alternator can be sufficiently suppressed at the beginning of the heater control operation, resulting in a more stable idling operation.

What is claimed is:

1. A window heater control apparatus for controlling a window heater for an automobile, said window heater control apparatus comprising:

generating means for generating a heating voltage for said window heater;

detecting means for detecting a heater-ON condition, said heater-ON condition being detected by sensing a turning on of a gear shift position switch when driving of said automobile is interrupted; and a heater control unit which includes, a timer counting a time lapse from detection of said heater-ON condition and outputting a time count value, a processor processing said time count value to produce a switching control signal, and a switching element, connected to said generating means, switching a supply voltage to said generating means in response to said switching control signal to gradually increase said heating voltage up to a predetermined heating voltage in accordance with said time lapse.

2. A window heater control apparatus for controlling a window heater for an automobile, said window heater control apparatus comprising:

generating means for generating a heating voltage for said window heater;

detecting means for detecting a heater-ON condition, said heater-ON condition being determined by sensing a turning on of a gear shift position switch when driving of said automobile is interrupted; and a heater control unit including a delay circuit delaying a supply of a predetermined heating voltage to said window heater upon detection of said heater-ON condition to gradually increase said heating voltage up to said predetermined heating voltage in accordance with a lapse of time from detection of said heater-ON condition.

* * * * *